Oct. 26, 1943. A. O. SCHOENINGER 2,333,048
EXTENSION BRACELET
Filed Oct. 23, 1941 2 Sheets-Sheet 1
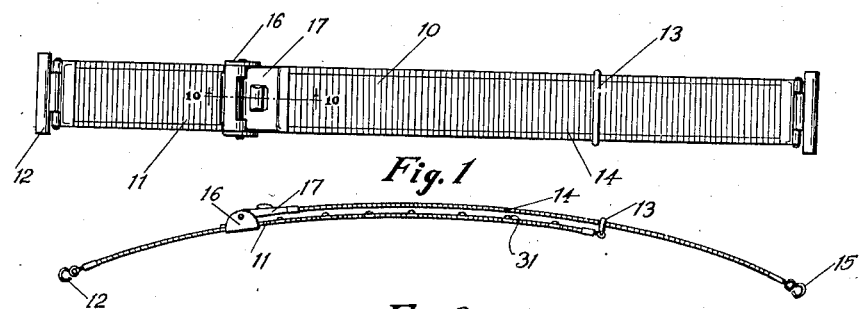
Fig. 1
Fig. 2
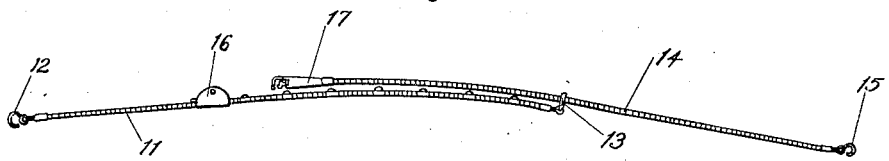
Fig. 3
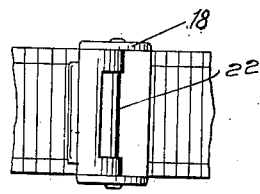
Fig. 4
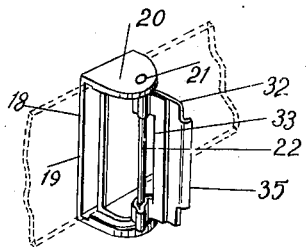
Fig. 6
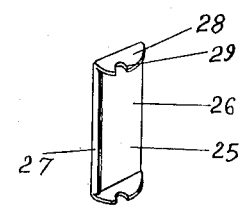
Fig. 7
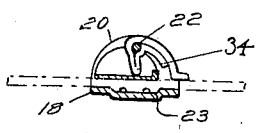
Fig. 5
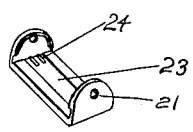
Fig. 8
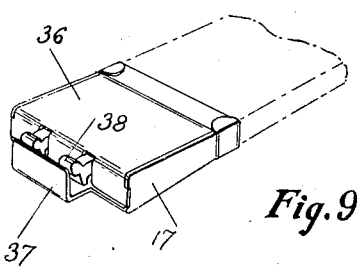
Fig. 9
Inventor
Adolf O. Schoeninger
By Nathaniel Frucht
Attorney Oct. 26, 1943.  A. O. SCHOENINGER  2,333,048
EXTENSION BRACELET
Filed Oct. 23, 1941  2 Sheets-Sheet 2

Inventor
Adolf O. Schoeninger
Nathaniel Frucht
By
Attorney

Patented Oct. 26, 1943

2,333,048

UNITED STATES PATENT OFFICE 2,333,048

EXTENSION BRACELET

Adolf O. Schoeninger, Irvington, N. J., assignor to Forstner Chain Corporation, a corporation of New Jersey Application October 23, 1941, Serial No. 416,234

2 Claims. (Cl. 24—239)

My present invention relates to the jewelry art, and has particular reference to the manufacture of extension bracelets.

The principal object of my invention is to provide an improved releasable adjustable catch and latch arrangement for an extension bracelet.

Another object of the invention is to provide a spring pressed latch arrangement of readily manufactured and easily assembled parts.

With the above and other objects and advantageous features in view, the invention consists of a novel arrangement of parts more fully disclosed in the detailed description following, in conjunction with the accompanying drawings, and more specifically defined in the claims appended thereto.

In the drawings,

Fig. 1 is a plan view of the novel bracelet construction;

Fig. 2 is an edge view thereof, the catch and latch being in assembled relation;

Fig. 3 is a view similar to Fig. 2, the catch being separated;

Fig. 4 is an enlarged plan view of the assembled catch and latch;

Fig. 5 is a central vertical section therethrough.

Fig. 6 is a perspective view of the adjustable catch, the parts being in adjustment position;

Figs. 7 and 8 are perspective details of two of the catch parts.

Fig. 9 is an enlarged perspective showing the assembled latch.

Figure 10:
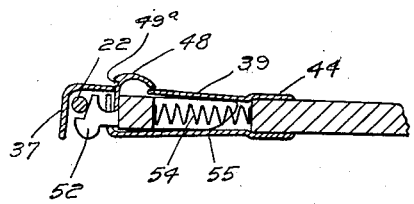
Fig. 10 is a central vertical section therethrough.
Figure 11:
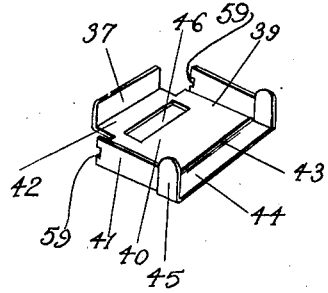
Figs. 11, 12, 13 and 14 are perspective details of the latch parts.

It has been found desirable to provide an improved catch and latch construction for extension bracelets having overlying bracelet portions, one portion being provided with an adjustable catch which may be selectively positioned along the length thereof, and the other portion having a latch at its end which may be releasably secured to the catch. The essential features of the invention reside in a novel construction for facilitating the adjustment, securing and release of the catch and latch parts.

Referring to the drawings, the bracelet 10 includes a lower section 11, see Figs. 2 and 3, which has an end hook 12 at one end for attachment to one bail of a wrist watch, and a slide loop 13 at the other end through which an upper bracelet section 14 extends, the further end of the section 14 having an end hook 15 for attachment to the other bail of the wrist watch. An adjustable catch 16 is slidably positioned on the strap section 11, and may be locked at a selected point thereon so as to change the effective length of the bracelet, the strap section 14 having a latch 17 which is detachably securable to the catch 16.

As shown in Figs. 4 to 8, the catch includes a base 18, preferably of stamped metal, having a bottom plate 19 and two side plates 20, each side plate having an opening 21 for receiving a pivot and catch pin 22. The bottom plate has a shallow central recess 23, which may have cross ribs 24, to better lock with the lower surface of the bracelet section 11 in cooperation with an upper lock part 25, which has a flat lower portion 26 terminating in an upstanding edge 27, and having two side plates 28 which each have slightly inclined slots 29 in which the ends of the pin 22 are receiving, the upper edges of the side plates being concealed beneath inturned edges 30 of the side plates 20.

As shown in Fig. 5, the proportions of the parts permit the bracelet section 11 to be received between the bottom plate 19 of the base 18 and the flat lower portion 26 of the upper lock part, the slots 29 permitting slight relative movement of the parts to accommodate the lower bracelet section, which may have projecting ribs 31 on the upper surface thereof. A clamp element 32 is also mounted on the pin 22, this element being made of sheet metal and shaped to provide a central recess 33, spaced end clamp teeth 34, and a finger tab 35. When the finger tab is lifted to release the clamp teeth, the upper lock part is released, and the catch may be moved along the lower bracelet section to adjust the total bracelet length, the securing of the catch in place placing the free central portion of the pin 22 in position to receive the cooperating latch parts.

Referring to Figs. 9 to 14, the latch 17 includes a box-like housing 36 which has a forward positioning plate 37 and spring pressed retractable latch teeth 38. The latch assembly is accomplished by providing a frame 39, see Fig. 11, having a base plate 40, side plates 41, and a forward extension 42 which is bent at right angles to provide the plate 37. The base plate is slightly depressed at the rear, as indicated at 43, to provide a rear portion 44 having end lock tabs 45, the end of the bracelet being positioned on the rear portion 44 and secured thereto, preferably by spot welding; a cross slot 46 is provided at the forward end of the frame.

Figure 12:
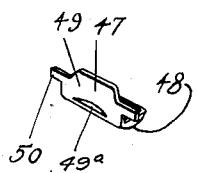
Figure 13:
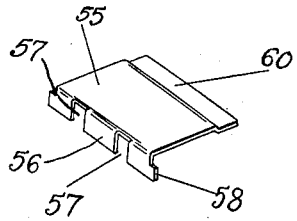
Figure 14:
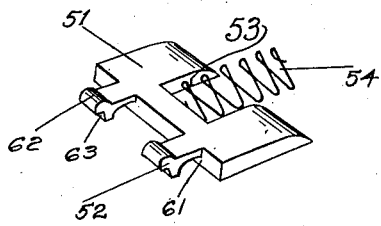

A finger piece 47, see Fig. 12, has a button 48, a press plate 49 at right angles thereto, stop lugs 50, and a finger nail lip 49a to be used for sliding the finger piece 47 being passed through the slot 46 to position the press plate 49 in parallel relation to the positioning plate 37. A tooth support 51, see Fig. 14, is of generally rectangular shape, with two spaced latch teeth 52 and a rear recess 53 adapted to receive a spring element 54. The support 51 and spring 54 being placed on the base plate 40 with the press plate 49 between the teeth 52, as hereinafter described, and the spring pressing against the bracelet end, a cover element 55 is mounted to close the frame 39, the cover element having a front plate 56, slots 57 for free movement of the teeth 52, the front plate 56 having end lugs 58 adapted to seat in corresponding recesses 59 in the side walls 41 of the frame, see Fig. 11, the rear of the cover element being depressed as indicated at 60, and being aligned with the rear portion 44 of the frame to be secured by means of the lock tabs 45 which are bent over to seat in the depressed portion.

Referring now to Fig. 14, the teeth 52 are cut as illustrated to provide abutments 61 which are contacted by the lugs 50 of the finger piece 47; the teeth have rounded surfaces 62 which permit snapping of the teeth over the pin 22 of the catch, see Fig. 10, and undercut surfaces 63 which prevent accidental release of the pin after snapping in.

The above described construction thus utilizes a simple arrangement of easily manufactured and assembled parts, preferably made of stamped sheet metal; the latch teeth are readily snapped over the free portion of the catch pin after the positioning plate is extended over the pin 22, and securely held until the finger piece button 48 is pushed back, thus forcing the teeth support and the teeth back against the spring 54 to permit lifting release of the latch from the catch.

Although I have described a specific constructional embodiment of my invention, it is obvious that changes in the size, shape, proportion, and relative arrangement of the parts, may be made to meet the requirements for different bacelet designs, without departing from the spirit and the scope of the invention as defined in the appended claims.

I claim:

1. A latch device for a separable bracelet connection having a catch device on one bracelet portion provided with a transverse catch rod, comprising a housing having a positioning plate extending downwardly at right angles to be positioned over the catch rod, and a latch tooth body having a rounded forward portion extending towards the plate and then extending rearwardly and upwardly to provide an undercut recess for receiving the catch rod, a spring device yieldably urging said latch tooth body towards the positioning plate, whereby the rounded portion may be snapped over the catch rod to seat the catch rod in the recess, and finger engageable means for retracting the latch tooth body against the spring device to permit removal of the catch rod from the recess.

2. A latch device for a separable bracelet connection having a catch device on one bracelet portion provided with a transverse catch rod, comprising a housing having a positioning plate extending downwardly at right angles to be positioned over the catch rod, and a latch tooth body having a rounded forward portion extending towards the plate and then extending rearwardly and upwardly to provide an undercut recess for receiving the catch rod, a spring device yieldably urging said latch tooth body towards the positioning plate, whereby the rounded portion may be snapped over the catch rod to seat the catch rod in the recess, and finger engageable means comprising a plate member mounted in said housing and engaging said latch tooth body, said plate member having a finger engageable button for retracting the latch tooth body against the spring device to permit removal of the catch rod from the recess.

ADOLF O. SCHOENINGER.